June 20, 1939.   H. PULFRICH   2,163,407
CERAMIC-TO-METAL-SEAL
Filed Oct. 1, 1937
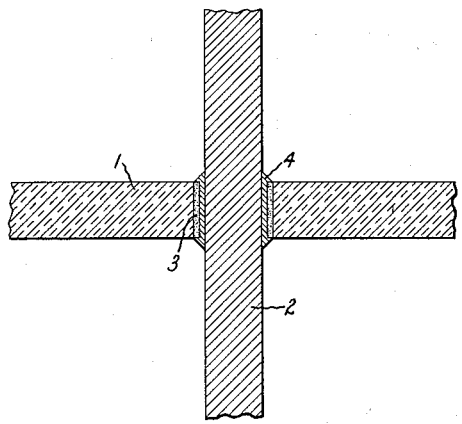
Inventor:
Hans Pulfrich,
by Harry E. Dunham
His Attorney.

Patented June 20, 1939

2,163,407

UNITED STATES PATENT OFFICE 2,163,407

CERAMIC-TO-METAL SEAL

Hans Pulfrich, Berlin-Friedenau, Germany, assignor to General Electric Company, a corporation of New York Application October 1, 1937, Serial No. 166,902
In Germany October 10, 1936.

3 Claims. (Cl. 18—59)

Attempts to join metal and ceramic parts are generally attended with considerable difficulties. In making metal-to-ceramic junctions it has been customary to use a glass flux or paste, or glazing material between the parts. However, this not only impairs the electrical properties of ceramic substances, but renders the junctions sensitive to temperature effects. The mechanical strength of an intermediate layer of glazing material is effected, particularly its tensile strength.

It has been found that a vacuum tight joint, without the usual glazing, may be made between metal and ceramic parts. According to this invention a metal powder of high melting point is spread on the ceramic body, and is sintered or cemented to the body at a temperature higher than the fusion point of the eutectic solid solution having the lowest fusion point in the ceramic body. A ceramic metallized according to this invention may be soldered to metal.

The novel features of the present invention are set forth in the appended claims. The invention itself, however, will be understood most readily from the following description when considered in connection with the accompanying drawing in which the single figure represents a cross-sectional view of a composite structure embodying the invention and, more particularly, illustrates a cross-sectional view of a metallic member sealed to a part of a ceramic body in accordance with the invention. In this figure, the reference numeral 1 designates the ceramic body; 2, a metallic member passing through an opening in said body; 3, a thin layer of powdered refractory metal anchored in the surfaces of the side walls of the opening in the ceramic body; and 4, a mass of solder uniting or bonding the member 2 with the layer 3 and forming a vacuum-tight seal between said member and the ceramic body 1. The particular structural arrangement shown in the figure is merely for the purpose of illustrating the invention and, as will be obvious from the following description, the invention is not limited thereto.

Metals possessing a high melting point according to this invention are metals which will not soften or fuse at the melting temperature of the solder to be used, or at the melting point of the eutectic possessing the lowest melting point contained in the ceramic substance.

The ceramic body should have a large vitrification range so that the fusion point of the eutectic or low melting point solid solution contained in the ceramic material may be several hundred degrees centigrade lower than the softening point of the ceramic material. This low temperature eutectic substance should be molten, though it should not flow out of the ceramic body at the temperature at which the metallic powder is sintered upon the body.

The various temperatures according to this invention should preferably be graduated as follows. The melting temperature of the eutectic having the lowest melting point should lie substantially below the vitrifying temperature of the ceramic body. Both the melting point of the metal powder as well as the melting point of the ceramic should lie considerably above the temperature at which the metal powder is sintered upon the support. The metal powder, at this temperature, should not result in particularly dense sintering since a porous coating of metal is advantageous, the porous covering being desirable for it offers the solder a large and irregular area to which it may adhere. As a general rule it is advantageous to choose the melting temperature of the solder lower than the melting temperature of the eutectic having the lowest fusion point. The temperature difference between the sintering or burning-on temperature of the metal powder and the fusion temperature of the low temperature eutectic should be about 200° C. or more.

According to this invention, the metal powder will be locked or gripped by the molten portions of the surface of the ceramic body and firmly and undetachably anchored therein after cooling. By the addition or incorporation of mineral insulator constituents in the ceramic body conditions can be made so that after cooling the entire ceramic body consists of a uniform crystal structure free from vitreous portions so that the high fusion metal powder is not anchored in a glass flux, but rather in the crystal structure. Among the mineral insulators that may be considered for the purpose are pyrolusite, barium oxide, calcium oxide (lime), zirconium oxide and sodium tungstate. The ceramic body, prior to the burning-on of the metal coating, may be baked and trimmed to shape.

The solder for joining the metallized ceramic to a metal part or body should consist of a metal or a metallic alloy which will not alloy with the metal of the coating. If the metal part is attacked by the solder with a resultant alloy formation, the newly formed solder-alloy must be of such nature that it will not form an alloy with the metallic coat. Silver has proved to be a good solder for joining a tungsten coated ceramic and a metal part of iron or ferro-nickel. The metal coating or layer may comprise a combination of several metals.

According to this invention, it is feasible to directly join metal parts to ceramics that are suited for high frequency work. Intermediate or accessory parts liable to disturb or impair the mechanical or electrical properties of the ceramic are no longer required.

Satisfactory results have been obtained with a ceramic body having the following composition in terms of weight percentage:

| | Percent |
|---|---|
| Magnesia, MgO | 30 |
| Silica, $SiO_2$ | 61 |
| Alumina, $Al_2O_3$ | 4 |
| Lime, CaO | 2 |
| Pyrolusite, $MnO_2$ | 3 |

In such a batch the mineral insulator constituents insure a eutectic substance that will fuse at a comparatively low temperature. The eutectic having the lowest melting point of the ceramic body described melts at around 1100° C., the burning temperature of the ceramic body lies between 1350 and 1400° C., and the body fuses between 1450 and 1500° C. Tungsten powder was sintered on at around 1300° C., whereupon a metallic part consisting of ferro-nickel was soldered fast by the aid of pure silver solder. The tungsten powder on the ceramic body is preferably fired at about 1300° C. for about 30 minutes.

The present invention is separate and distinct from the inventions disclosed and claimed in my co-pending applications Serial Nos. 175,958 and 175,959 and in the co-pending application of Hans Pulfrich and Richard Magner, Serial No. 175,960, all of which applications were filed November 22, 1937, and are assigned to the same assignee as the present invention. In application Serial No. 175,958 I disclosed and claimed a novel arrangement for conducting current through the walls of electric devices and for forming a vacuum-tight seal between the electrically conducting and insulating members. In application Serial No. 175,959 I disclosed and claimed specific means for making a vacuum-tight seal between a ceramic body and a metallic conductor passing through an opening in such body. The invention disclosed and claimed in Pulfrich and Magner application Serial No. 175,960 is an improvement upon the invention covered by the subject application, and more particularly is concerned with ceramic-to-metal seal structures wherein the ceramic body contains one or another of the oxides of titanium, zirconium, hafnium or thorium, such oxides having been discovered to improve the adherence of the solder to the ceramic body.

What I claim as new and desire to secure by Letters Patent of the United States is:

1. In combination, a metal member, a ceramic body comprising by weight about 30 per cent magnesia, 61 per cent silica, 4 per cent alumina, 2 per cent lime, and 3 per cent pyrolusite, a thin layer consisting of refractory metal powder on the surface of said ceramic body and adhesively held to said body by an eutectic solid solution of the body, and a solder with a melting point below the softening temperature of said solution joining the metal member and the metal powder on the ceramic body.

2. In combination, a metal member, a ceramic body containing an eutectic solid solution having a lower melting point than the melting point of the ceramic body, a thin layer consisting of refractory metal powder on the surface of the said ceramic body and adhesively held to the said body by the said eutectic solution, and a solder with a melting point below the softening temperature of the said solution joining the metal member and the metal powder on the ceramic body.

3. In combination, a metal member, a ceramic body containing an eutectic solid solution having a lower melting point than the melting point of the ceramic body, a thin layer consisting of powdered tungsten on the surface of the said ceramic body and adhesively held to the said body by the said eutectic solution, and a solder comprising silver joining the metal member and the tungsten powder on the ceramic body, said solder having a melting point below the softening temperature of the said eutectic solution.

HANS PULFRICH.